Figure 1:
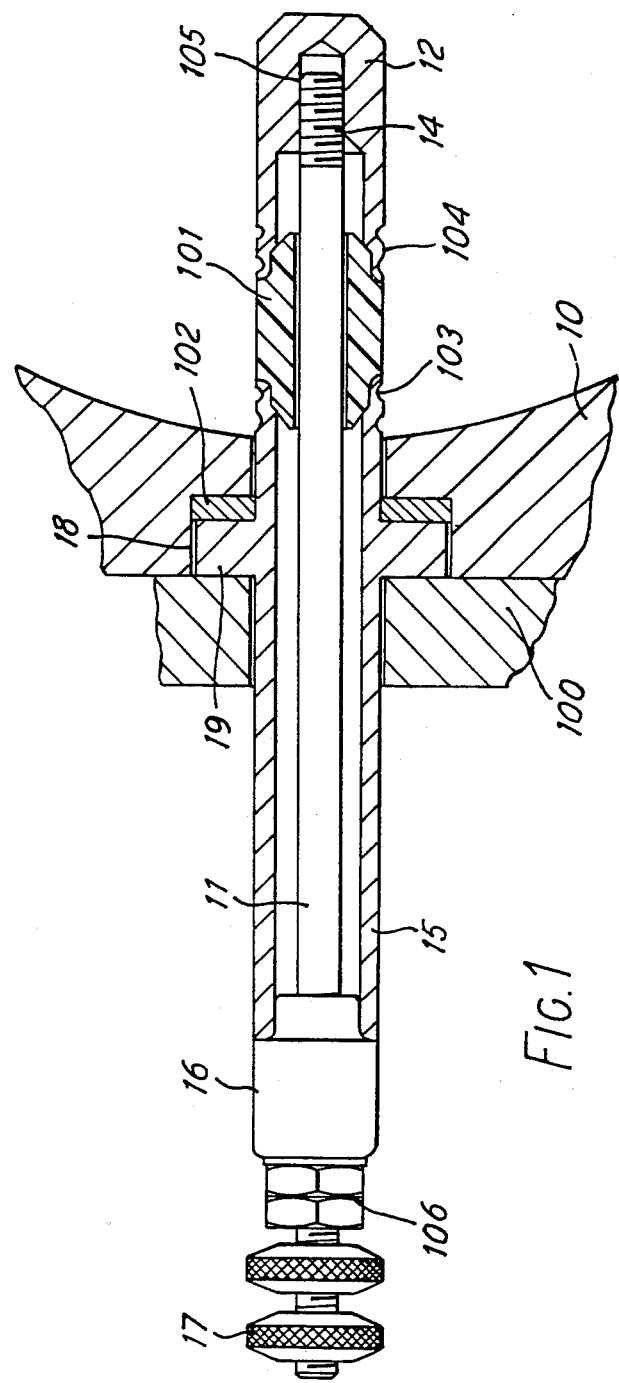

United States Patent [19]

Tovey

[11] Patent Number: 4,714,189

[45] Date of Patent: Dec. 22, 1987

[54] BRAZING EUTECTIC AND METHOD

[75] Inventor: Stuart J. Tovey, Aldershot, England

[73] Assignee: Schlumberger Electronics (U.K.) Limited, Farnborough, England

[21] Appl. No.: 844,427

[22] Filed: Mar. 26, 1986

[30] Foreign Application Priority Data

Mar. 27, 1985 [GB] United Kingdom ............... 8507909

[51] Int. Cl.⁴ .................... H01B 17/30; B23K 1/04
[52] U.S. Cl. .................... 228/122; 228/263.12;
 73/304 R; 73/866.5; 420/502
[58] Field of Search ................ 228/122, 124, 263.11,
 228/263.12; 420/502; 73/304 R, 866.5

[56] References Cited

U.S. PATENT DOCUMENTS

| | | | |
|---|---|---|---|
| 1,977,898 | 10/1934 | Seniff | 73/304 R |
| 2,917,140 | 12/1959 | Omley | 228/263.12 |
| 3,055,465 | 9/1962 | Pulfrich et al. | 228/122 X |
| 4,180,700 | 12/1979 | Kraska et al. | 228/122 |
| 4,507,521 | 3/1985 | Goellner | 73/304 R X |
| 4,540,479 | 9/1985 | Sakurai et al. | 228/124 X |
| 4,591,535 | 5/1986 | Mizuhara | 420/502 X |
| 4,623,513 | 11/1986 | Mizuhara | 420/502 |

FOREIGN PATENT DOCUMENTS 559434 6/1958 Canada ................... 420/502
1587253 4/1981 United Kingdom .

Primary Examiner—Kenneth J. Ramsey
Attorney, Agent, or Firm—Dale Gaudier

[57] ABSTRACT

A sensor for assessing conditions within a metallic high pressure boiler 10, has a sensitive tip section 12, which is insulated from the boiler by virtue of a ceramic spacing member 101. The joins between the member 101 and sensor body 15 and tip 12 respectively are subject to full boiler pressure. The present invention provides a pressure seal by virtue of forming a brazed seal between the parts by forming a ceramic component to be brazed in a ceramic of average gain size of substantially between 5 and 15 microns and of purity exceeding 99% with a maximum silica content of substantially 0.2%, introducing between components a eutectic of substantially the composition: 80% to 90% silver; 5% to 6% copper; less than 6% titanium; and sufficient in quantity to fill gap therebetween, and subjecting the components to a temperature in excess of eutectic liquids temperature while maintaining the components in a vacuum.

7 Claims, 3 Drawing Figures

BRAZING EUTECTIC AND METHOD

This invention relates to the brazing together of certain ceramic components with other ceramic or metal components, and to providing a pressure sealing joint therebetween. In particular the invention relates to high pressure electrodes and their manufacture.

Electrodes may be used for sensing properties of surrounding materials, for example the presence or absence of water in a boiler. Such an electrode may be insulated from a further electrode and a parameter measurement performed between the pair. Where a container is conductive one electrode of the pair may be constituted by the container and regarded as a ground connection. A series of electrodes arranged for resistance to be measured at various levels in a container for example would enable water level in the container to be assessed.

A suitable electrode could be formed as a steel rod entering the container through a sealed entry port, the seal incorporating an insulator so that the rod is usable as an electrode. Insulators which have been employed for this purpose include some ceramic materials such as Aluminium Oxide ($Al_2O_3$).

In some electrode applications, for example the assessment of water level in a boiler in operation, the electrode and in particular its seal may be required to withstand a high pressure. Electrodes are required for example for measurement of boilers operating in excess of 200 bar.

In order to withstand such pressure, the electrode must be sealingly bonded to its insulator. Conventional methods of joining metals to ceramics such as by adhesive and by the shrink fitting of a heated metal component have proved inadequate for this purpose and in order to provide such a bond brazing has been employed, and electrodes having a stainless steel to ceramic seal capable of withstanding test pressures of 450 bar have been made.

The known process is that of molybdenum/manganese brazing in which a paste containing molybdenum and manganese is applied to the area of the ceramic to be joined and fired to the silica phase of the ceramic. Good bonds may be achieved with ceramics having a grain size averaging about 30 microns and a silica content of about 0.5%. When firing is complete the fired ceramic may be directly electro-plated to allow soldering with conventional soldering alloys.

Unfortunately the life of such electrodes has not proved to be as long as hoped, a number being prone to premature failure in the region of the electrode/insulator bond. Investigation has revealed some flaws in the ceramic insulator in the region of the brazed joint, which is thought to be due to adverse effects on ceramic material integrity during the brazing process, and the hostile environment of use, including high pressure steam.

It is known that certain elements, for example titanium and lithium will react at certain temperatures with oxide ceramics to produce a molecular bond. This process has shown itself capable of producing very high strength joints between ceramic and certain metal components. However since the metal component must itself be made of titanium to use the process, the extent of the reaction is uncertain with consequent doubts about the nature and strength of the resulting joints. In particular it is known that the presence of large quantities of titanium promotes migration through a eutectic, causing local cracking of the ceramic as the components cool from brazing temperature. Use of such joints for pressure seals is therefore questionnable.

According to the present invention there is provided a method of brazing a ceramic component to another component, including the steps of:
  forming a ceramic component to be brazed in a ceramic of average gain size of substantially 5 and 15 microns and of purity exceeding 99% with a maximum silica content of substantially 0.2%.
  introducing between components a eutectic of substantially the composition:
  80% to 90% silver
  5% to 6% copper
  less than 6% titanium.
  and sufficient in quantity to fill gap therebetween, and
  subjecting the components to a temperature in excess of eutectic liquidus temperature whilst maintaining the components in a vacuum.

According to a still further aspect of the present invention there is provided a pressure seal between a ceramic component and another component comprising a brazed joint therebetween, the joint being made with a eutectic of substantially the composition disclosed above. Such a seal may be employed in a high pressure electrode.

The present invention also provides a sensor electrode, having a metal electrode tip insulated from a metal body by virtue of a ceramic spacing member and pressure sealed as hereindescribed.

For a sound joint particularly one for use as a pressure seal it is important that there is not an excess of available titanium, else damage to the joint by metal migration will occur on cooling. Thus in accordance with the present invention the titanium content of the eutectic is restricted dependent upon the silica content of the ceramic.

It is also important that the good brazing practice of confinement of the eutectic to the vacinity of the joint and avoidance of excess brazing materials should be observed. The former may be straightforwardly achieved by exploiting the capillarity of the liquid phase, but the later may be difficult to achieve, particularly with the small component spacing (of the order of 10 microns) that is desirable for a pressure seal. Unfortunately surface excess can dramatically degrade seal performance and in accordance with a further feature of the present invention a channel is provided to direct excess material away from the surface.

The eutectic may be introduced in elemental form, where essentially annular components are to be joined, the material may be introduced by means of washers or annuli of silver and titanium.

In order that features and advantages of the present invention may be further appreciated an embodiment and example will now be described with reference to the accompanying diagrammatic drawings of which:

FIG. 1 represents an electrode for use at high pressure and

Figure 2A:
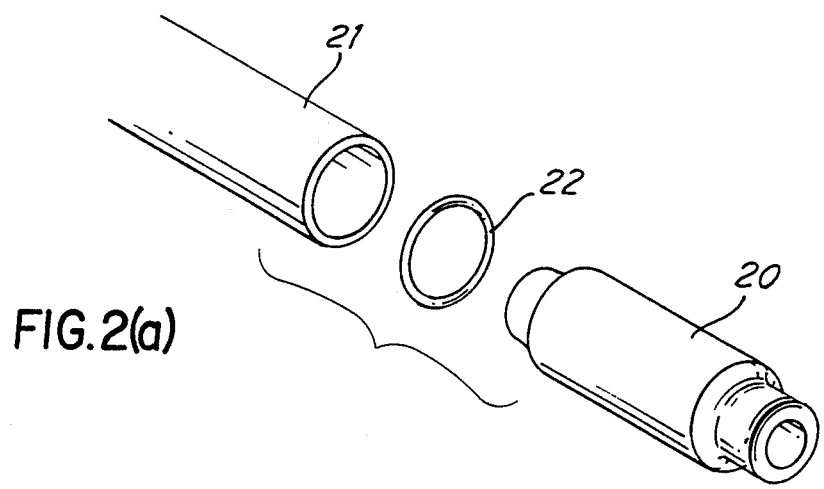
Figure 2B:
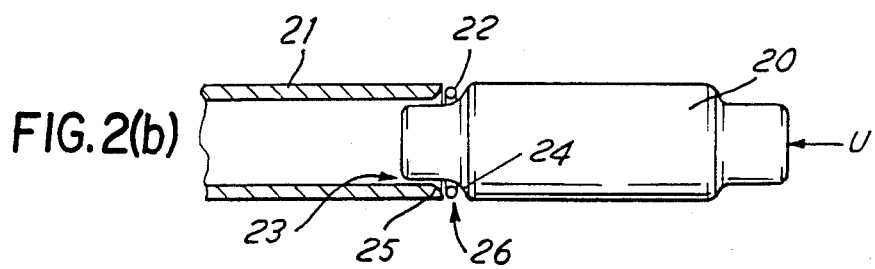

FIGS. 2(a) and 2(b) represents ceramic and metal components to be
sealingly jointed.

In a sensor (FIG. 1) for assessing the level of water in a boiler 10 a stainless steel rod electrode 11 has a tip section attached through the agency of a stud 14 threaded into the rod end. The rod is surrounded by a stainless steel sheath 15 and spaced apart there from by an insulating collar 16. The rod is terminated in a screw type electrical connection 17 to allow electrical connection thereto. In use, the sensor is introduced into the body of the boiler through a hole in boiler wall 10, and secured in place by the cooperation of a circular well 18 in the boiler wall, a flange 19 on the sensor sheath and a clamping plate 100. Sealing is afforded by gasket 102.

Tip section 12 is brazed to the stud 14 and is configured as an extension of the sheath portion 15 but spaced apart therefrom by a ceramic spacer 101, which also serves to provide seperation and insulation from electrode rod 11. Thus in use the sheath 15 is at ground potential by virtue of contact with cylinder wall 10, and rod 11 and electrode tip 14 insulated therefrom so that a measurement may be made, for example an electrode/ground parameter measurement to establish water level as described in UK Pat. No. 1 605 145.

In addition to its separation and insulation function the ceramic spacer 101 provides a seal between cylinder interior and exterior and may be subject to the full operating pressure of the boiler of for example 200 bar. The sealing performance of the spacer 101 is largely determined by the quality of joins 103 and 104 between the spacer 101 and the stainless steel sheath 15 and between the spacer 101 and the electrode tip 12 respectively.

In the past the joins 103, 104 have been brazed using conventional brazing eutectics suitable for brazing stainless steel, such as for example a eutectic of active composition 92.5% silver and 6% copper. Unfortunately the lifetime of these joins has not been as long as hoped for and this has prompted an investigation of the brazing employed.

In a sensor in accordance wtih the present invention the ceramic spacer 101 is formed in $Al_2O_3$ of purity 99.5%, an average grain size of between 8 and 10 microns, a maximum silica content of 0.2% and density of at least 3.8 gm/cm$^3$. The brazing eutectic for joints 103, 104 is made up of 88% silver 5.6% copper and 1% titanium, with the remainder being residual impurities. Joint 105 between tip section 12 and electrode rod stud 14 is a conventional steel to steel braze.

In assembly of the sensor, stud 14 is first screwed into electrode rod 11 and sheath 15 held in place by spacer 16 and securing nuts 106. Spacer 101 is placed over the electrode rod 11 and sheath 15 held in place by spacer 16 and securing nuts 106. Spacer 101 is placed over the electrode rod, followed by tip section 12. Brazing eutectic is introduced at joins 103, 104, 105 being eutectic as described above for joins 103, 104, and conventional eutectic for stainless steel to stainless steel brazed joint 105. The assembly is then placed in a vacuum furnace for the braze to be made. The completed braze secures all parts together and provides a pressure secure sealing joint.

Aspects of the method of brazing in accordance with the present invention will now be considered in more detail.

A ceramic component 20 (FIG. 2(a) and 2(b)) is to be brazed to a stainless steel cylinder 21. As the components are brought together a eutectic 22 is introduced therebetween. During brazing the component must be held in the required relationship and urged together along direction U. For example the components may be held vertically in a jig (not shown) and urged together by virtue of the weight of component 20 acting down on cylinder 21.

Brazing eutectic 22 is introduced as an annulus lightly gripped between the components as they are brought together. The annulus may be straightforwardly formed as a single turn of abutting wire. The procedure to effect the braze is as follows.

Before being brought together, the components are thoroughly solvent cleaned, for example with Arklone or Freon. The components are placed in a vacuum furnace and a vacuum of at least $10^{-4}$ Torr establshed. The temperature is increased at a rate of 30° C. per minute until a temperature of 750° C. is reached, which is maintained for approximately 5 minutes. The temperature is further increased to 985° C. at the same rate, this temperature also being maintained for 5 minutes. The chamber is then allowed to cool slowly down to 750° C., whereupon the vacuum is released and argon gas introduced as a coolant. The brazed components may be removed at a temperature below 100° C.

The brazing eutectic may be formed as a coating of essentially conventional eutectic having a composition of 92.5% silver and 6% copper on a titanium wire, so that the final eutectic wire has a titanium content of about 1% by weight.

The mechanism of the novel brazing method described above has not been fully investigated, however it is thought that as the temperature rises and the eutectic becomes mobile oxygen affinity results in the formation of titanium and aluminium oxide compounds at or close to the ceramic surface. Further out from the surface titanium silver metallic compounds are formed, which are capable of bonding to the stainless steel. The layer build up is mutually cohesive, so that a ceramic/stainless steel bond may be achieved.

Titanium is known to have a close packed hexagonal structure (the alpha phase), which changes at the crystal transformation temperature of 882° C. to a body centered cubic structure (the Beta phase). Inherent impurities in commercially 'pure' titanium modify this temperature to approximately 900°/950° C. and the melting temperature to 1660° C. plus or minus 10%. During the beta phase, the titanium crystal develops an affinity for or with oxide ceramics, and in the presence of a suitable eutectic will migrate to the surface of the ceramic and form the layered compound of metallic oxides as described above, which allows the eutectic to 'wet' the surface of the ceramic and so effect a molecular bond.

In accordance with the present invention however, the mutually cohesive layer build up permits bonding of a ceramic to other metals, such as stainless steel and to other ceramics of substantially the same composition.

It is not essential that the eutectic be introduced in coherent or amalgam form, and in view of the difference in melting temperature of silver and titanium it is not preferred. The materials may be introduced as precursors which form the required composition during the brazing cycle. For example, for brazing the ceramic separator 101 of the sensor described above, separate annuli of silver, copper and titanium, in the form of washers stamped from thin sheet, may be introduced. For other applications a woven or platted braid made up of silver, copper and titanium elemental wires may be used.

In accordance with good brazing practice, it is important that there is not an excess of brazing material introduced between the components to be joined. It is particularly important that in pressure sealing applications residual material does not remain at the sealing surface. To prevent this the invention provides a diverting channel 23 formed between ceramic member 20 and metal member 21 which extends therebetween and away from the join, formed between complementary profiled surfaces 24 (of ceramic member 20) and 25 (of metal member 21).

Eutectic material in channel 21 is not required for a successful joint, its presence merely indicating that excess material has been harmlessly diverted away from sealing surface 26.

Prior art processes using titanium for the metal components do not allow for any control over the extent of the reaction. It seems that once a continuous film of titanium has formed on the surface of the oxide, titanium crystals tend to float about in the eutectic, combining with copper and other available impurities to form intermetallic compounds.

The structure of the ceramic used has a large influence upon the integrity of the finished joint. Almost all aluminium oxide ceramics intended for brazed assemblies are milled and compounded to accommodate the prior art moly/manganese process, which process requires a grain size of say 30 to 50 microns with a silica content of 1.3 to 1.5% to provide a suitable surface glassy phase to which the moly/manganese can be fired.

This ceramic formulation is generally not satisfactory for the method of the present invention. It has been established that aluminium oxide of 99.5% crystal purity, milled to nominally 30 microns, will after firing at approximately 1700° C. contain grains as large as 70 microns due to grain growth during the long firing process, this in turn means that silica-rich areas will develop between adjacent large grains. Where these occur on the surface of the ceramic, in an area to be brazed, the silica is leached out to form a silver silicide within the eutectic. This leaching of the silica phase of the ceramic leaves the alumina grains unsupported, thus creating a weak ceramic surface structure. This is prone to fracture due to the differing thermal coefficients of expansion (and contraction) of the eutectic and metal components during cooling.

It has further been established that a good aluminium oxide for reaction brazing has a crystal purity of 99.5% a maximum grain size of 20 microns and a silica content not greater than 0.18% and should be iso-statically pressed to provide a uniform density of 3.80 min:grams per cubic centimeter. In the fired condition this ceramic has a cross breaking strength in excess of 20 tons per square inch, a hardness value of 84 on the Rockwell 45N scale and the Youngs modulus is $52.7 \times 10$ lbsF/in.

Using this ceramic material with Ag/Cu plus 1% Ti eutectic in accordance with the present invention, and a joint profile based on a radius to spread the thermo-mechanical stresses, very good brazed joints have been achieved, both with ceramic to ceramic and ceramic to stainless steel joints.

I claim:

1. A method of brazing a ceramic component to another component, including the steps of:
   forming a ceramic component to be brazed in a ceramic of average gain size of substantially between 5 and 15 microns and of purity exceeding 99% with a maximum silica content of substantially 0.2%,
   introducing between components a eutectic of substantially the composition:
   80% to 90% silver
   5% to 6% copper
   less than 6% titanium,
   and sufficient in quantity to fill gap therebetween, and
   subjecting the components to a temperature in excess of eutectic liquidus temperature whilst maintaining the components in a vacuum.

2. A pressure seal between a ceramic component and another component comprising a brazed joint formed therebetween by the method according to claim 1.

3. A high pressure electrode including a pressure seal as claimed in claim 2.

4. A high pressure electrode as claimed in claim 3 and having a metal electrode tip insulated from a metal body by virtue of a ceramic member sealingly located therebetween.

5. A method of brazing a ceramic component to another component as claimed in claim 1 and including the step of providing a channel between the components to direct excess material away from the surface.

6. A method of brazing a ceramic component to another component as claimed in claim 5 and wherein the components are to be annularly joined including the step of introducing between the components the eutectic elementally in the form of annuli.

7. A method of brazing a ceramic component to another component as claimed in claim 1 and wherein the components are to be annularly joined including the step of introducing between the components the eutectic elementally in the form of annuli.

* * * * *